Dec. 25, 1923.  1,478,472
E. R. FELLOWS
HIGH SPEED GEAR SHAPER
Filed Jan. 13, 1920.   10 Sheets-Sheet 6

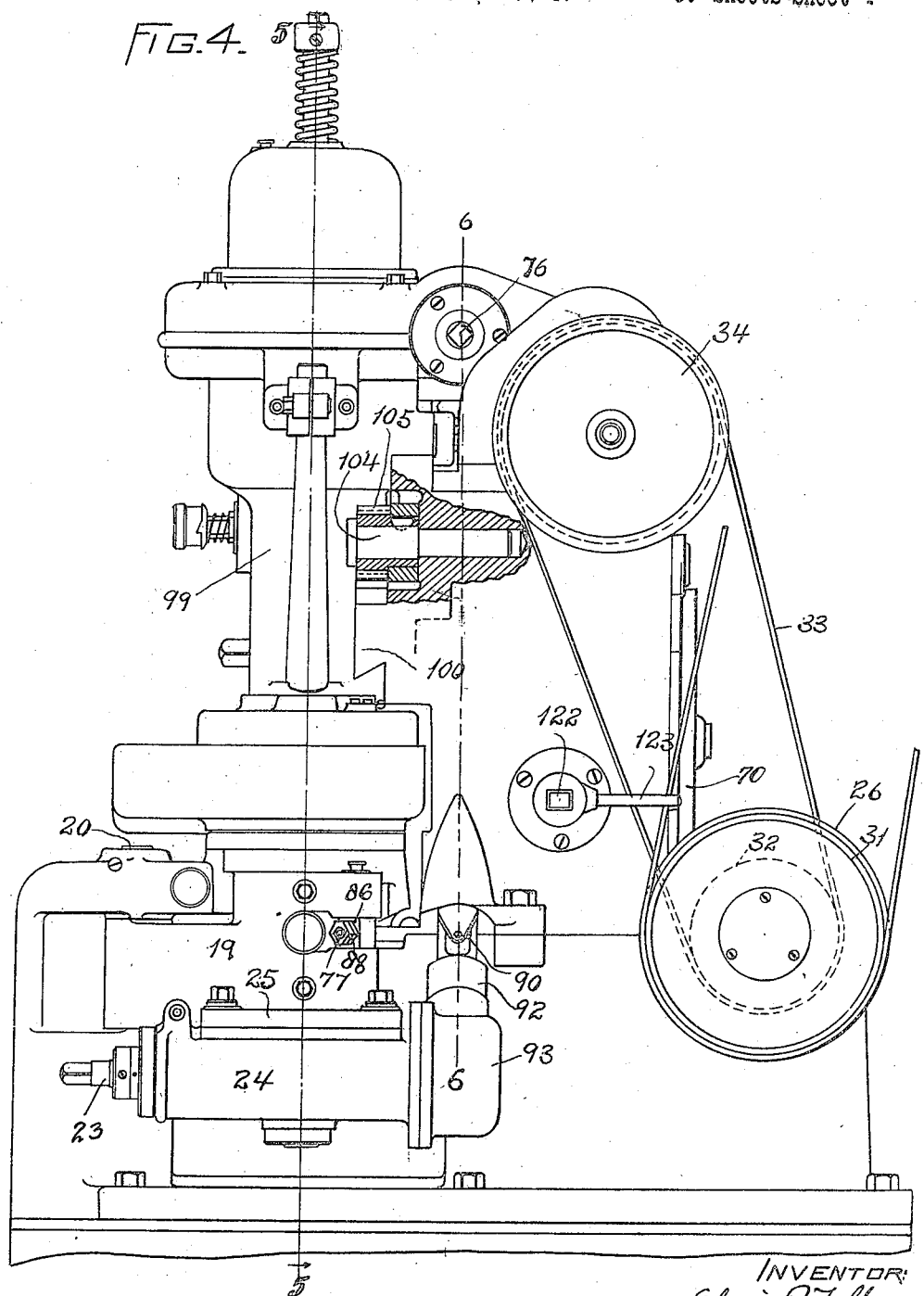

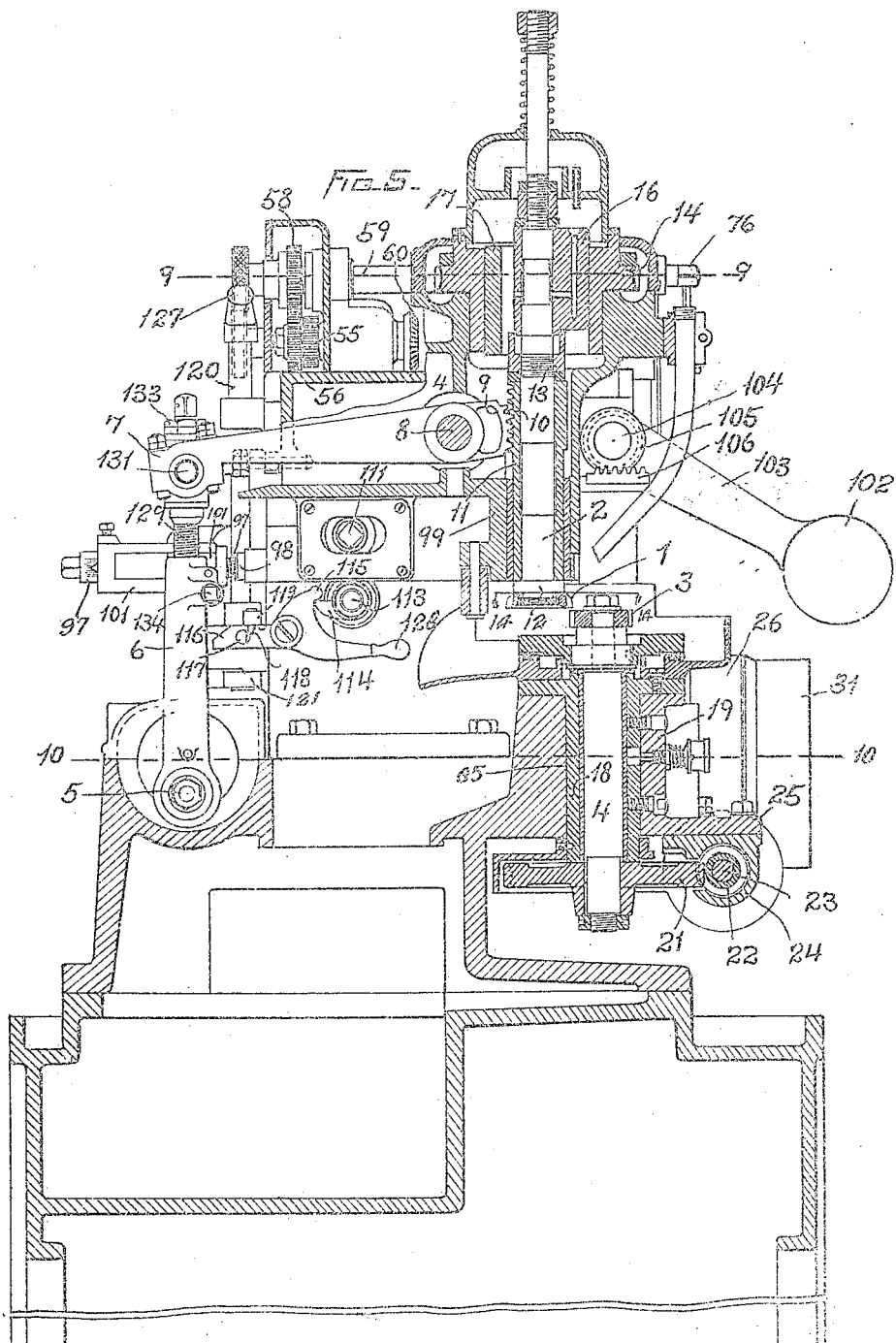

INVENTOR:
Edwin R. Fellows
by Wright, Brown, Quinby & May
ATTYS.

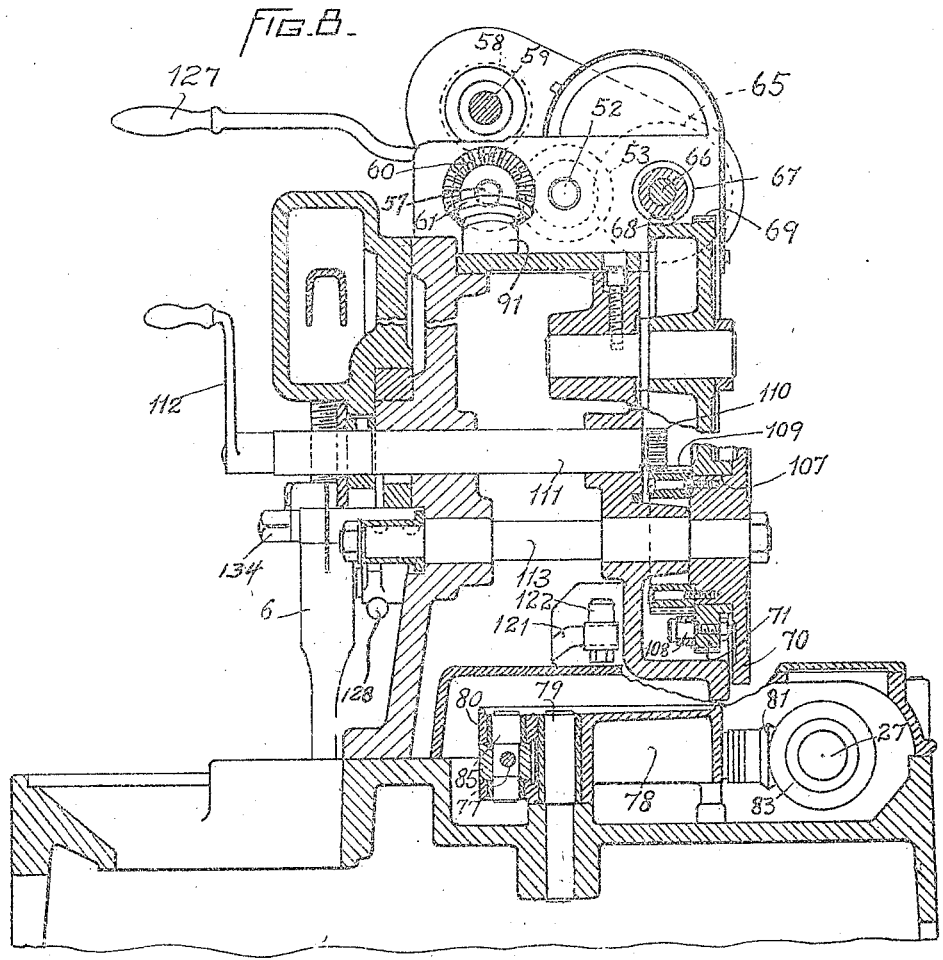
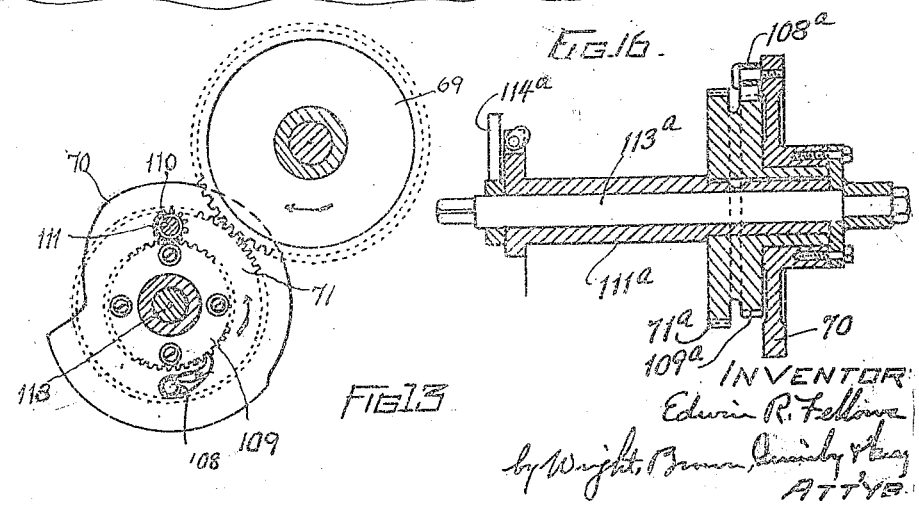

Dec. 25, 1923.
E. R. FELLOWS
1,478,472
HIGH SPEED GEAR SHAPER
Filed Jan. 13, 1920      10 Sheets-Sheet 9
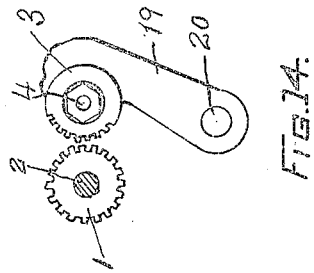
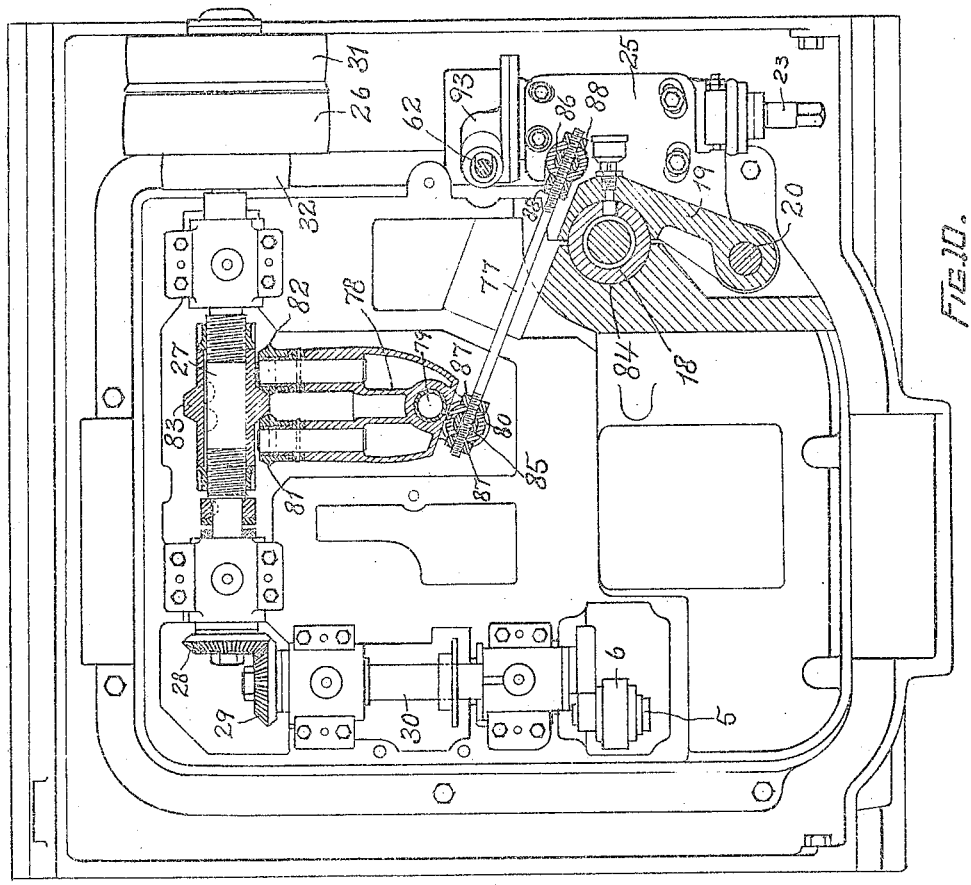

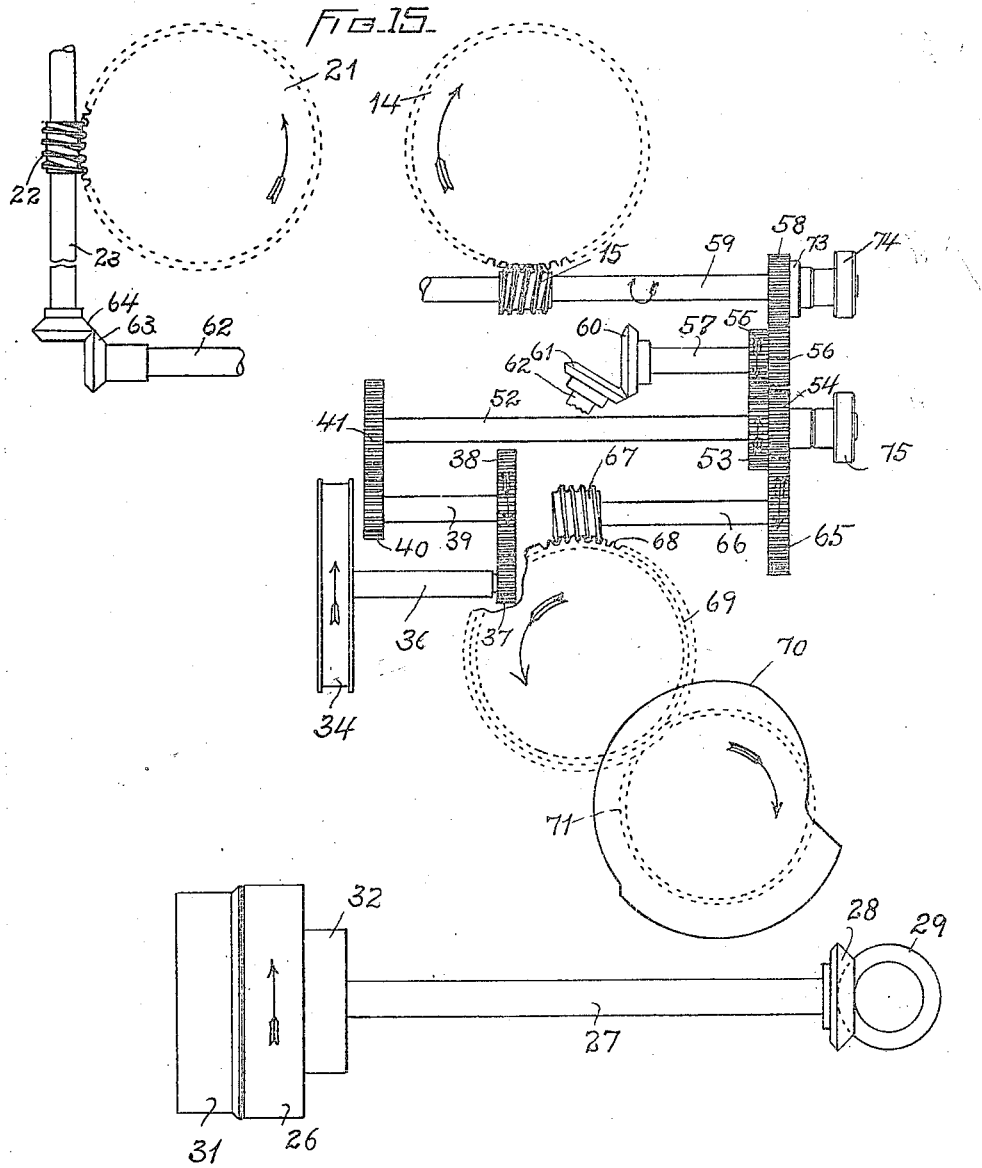

Patented Dec. 25, 1923.

1,478,472

UNITED STATES PATENT OFFICE.

EDWIN R. FELLOWS, OF SPRINGFIELD, VERMONT, ASSIGNOR TO THE FELLOWS GEAR SHAPER COMPANY, OF SPRINGFIELD, VERMONT, A CORPORATION OF VERMONT.

HIGH-SPEED GEAR SHAPER.

Application filed January 13, 1920. Serial No. 351,126.

*To all whom it may concern:*

Be it known that I, EDWIN R. FELLOWS, a citizen of the United States, residing at Springfield, in the county of Windsor and State of Vermont, have invented new and useful Improvements in High-Speed Gear Shapers, of which the following is a specification.

The present invention relates to gear shaping machines of the type previously patented by me, according to which the teeth of spur gears are generated and cut by a planing cutter having projections and cutting edges corresponding in arrangement and outline to involute gear teeth, which cutter is reciprocated substantially along the line of its axis across the face of a gear blank, whereby it cuts in the manner of a planing cutter, and both the cutter and the gear blank, or work piece, are rotated in unison to cause the cuts thus made to generate involute tooth curves in the work piece conjugate to the tooth curves of the cutter. My object in developing the present invention has been to produce a machine of that type which may be operated at high speed, with rapid production of work. In carrying out this object I have designed the machine to give a short and rapid stroke to the cutter, and have applied thereto new and improved means for controlling the position of the cutter relatively to the work, for backing off the work from the cutter during the return stroke of the latter, and for tripping the drive of the machine at the termination of the cutting cycle. In addition I have loaded the cutter carriage or saddle by means of a weight to maintain it in contact with the cam which controls its position, and I have also applied a new means for permitting independent rotatory adjustment of the cutter independently of the work, or such adjustment of the cutter and work in unison.

The precise nature of the invention, the principles involved in it, and the preferred mechanical construction in which it is embodied are best understood by reference to the drawings furnished herewith illustrating a machine embodying the invention, and the detailed description of such machine hereinafter following.

In the drawings, Figure 1 is a front elevation of the upper part of the machine above referred to.

Figure 4 is a right hand side elevation.

Figure 5 is a vertical section on a plane parallel to the front of the machine and located by line 5—5 of Figures 3 and 4.

Figure 8 is a vertical section taken on the line 8—8 of Figure 1.

Figure 9:
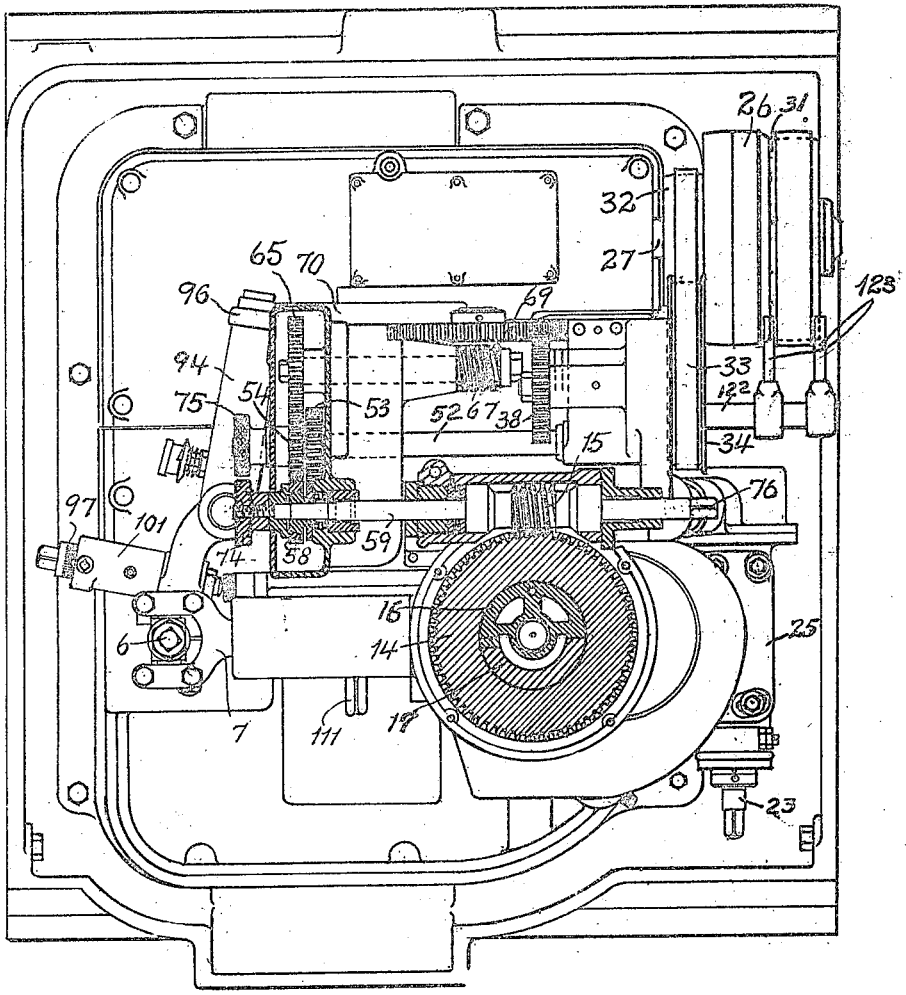

Figures 9 and 10 are plan views and horizontal sections taken on the lines 9—9 and 10—10, respectively, of Figure 5.

Figure 2:
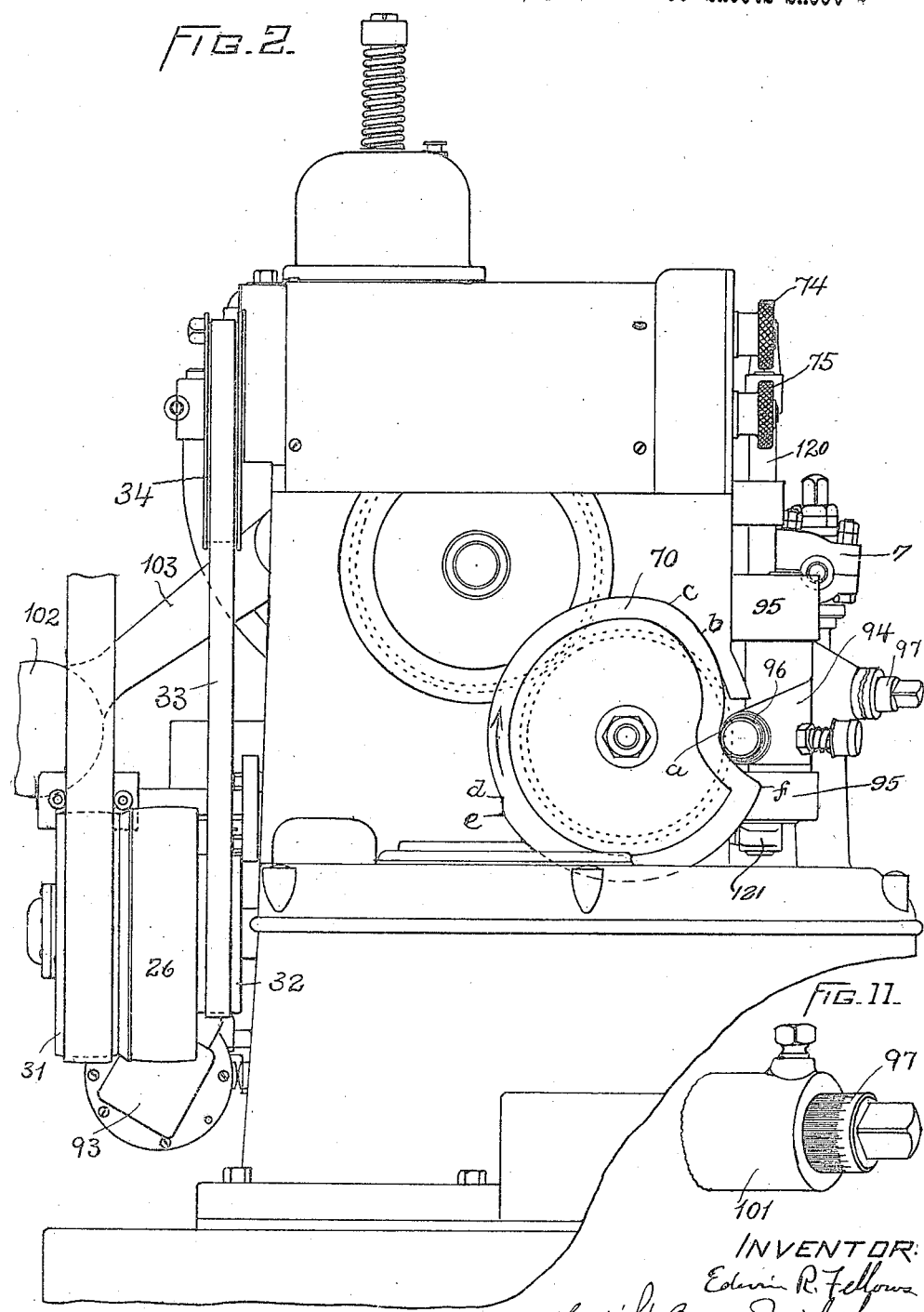
Figure 2 is a rear elevation.

Figure 11 is a fragmentary perspective view of a detail shown in Figure 2.

Figure 3:
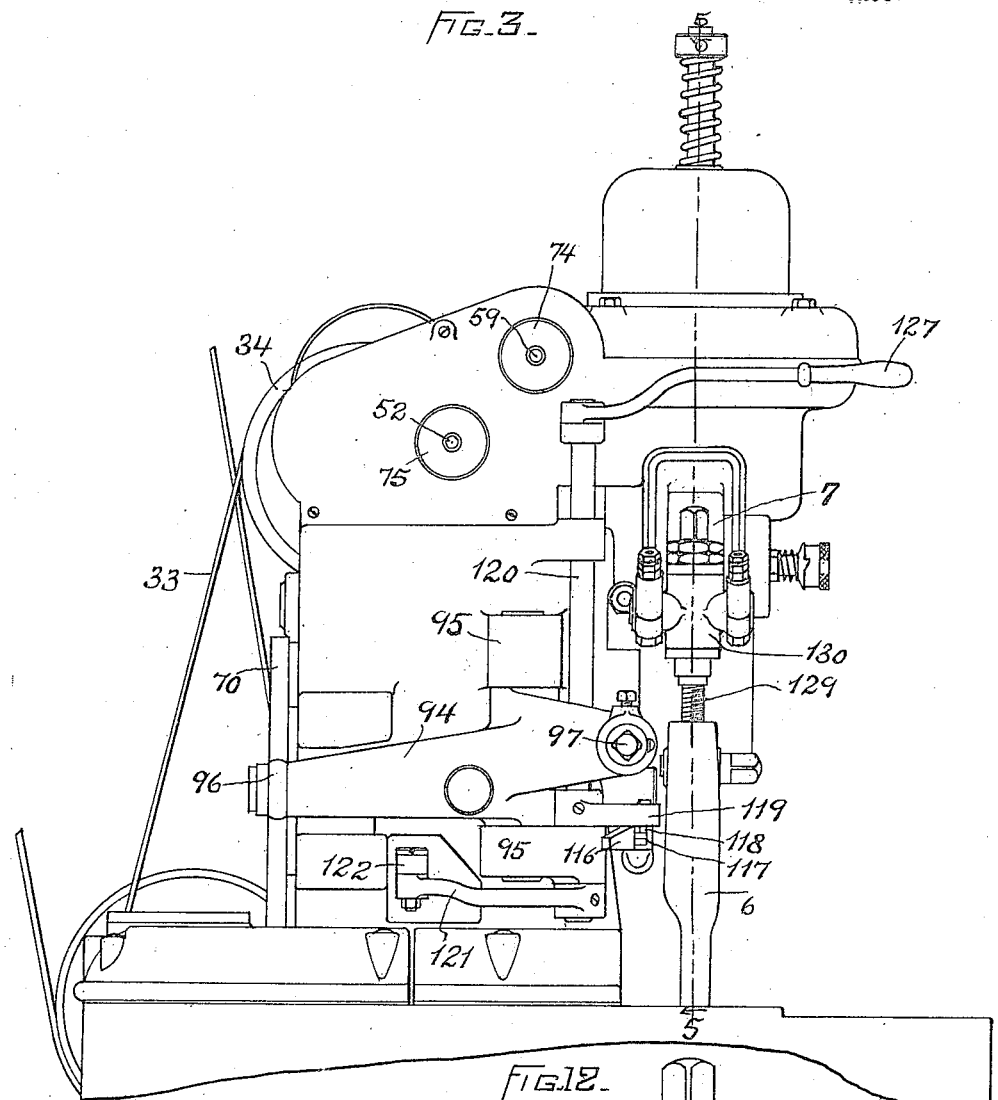
Figure 3 is a left hand side elevation.
Figure 12:
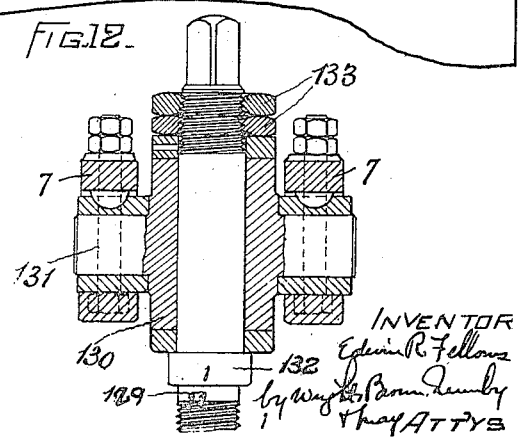

Figure 12 is a sectional view of a detail of the mechanism shown in Figure 3.

Figure 13 is a detail elevation of the drive for the cutter feed cam.

Figure 14 is a fragmentary detail view illustrating the direction in which the work is backed off from the cutter.

Figure 15 is a diagrammatic view of the entire feed and control mechanism resolved into the same plane.

Figure 16 is a sectional view showing a modification in the means for adjusting the cutter feed cam.

The same reference characters indicate the same parts in all the Figures.

Since much of the machine is like in principle, and similar in many details, to the machines disclosed in my prior patents, and particularly 676,227, June 11, 1901 and 879,531, February 18, 1908, I deem it unnecessary to describe the main parts shown in the drawings which are common to this and my prior machines further than to identify them. 1 is the cutter which is mounted upon a rotatable and reciprocable cutter spindle 2, and 3 is the work piece mounted upon a rotatable work spindle 4 (Figure 5). The cutter spindle is reciprocated by mechanism consisting of a crank pin 5, a connecting rod 6, and a lever 7 pivoted on a stud 8 and having a segment arm 9 which meshes with rack teeth 10 on a sleeve 11 which fits the spindle and is confined between shoulders or abutments 12 and 13. Rotation is imparted to the cutter spindle by an index worm wheel 14 driven by a worm 15 (Figures 9), the spindle being engaged slidingly but non-rotatably with the worm wheel by the medium of a semicylindrical shoe 16 carried by the spindle and a complemetal semicylindrical guide 17 secured to the interior of the index wheel and its hub.

The work spindle 4 is seated rotatably within a quill 18 which is secured by means clearly shown in Figure 5 to an apron 19 pivoted upon a pin 20 secured to the main frame. An index worm wheel 21 is secured to the spindle 4, which it rotates; and it is itself rotated by a worm 22 secured to a shaft 23 and contained in a housing 24. This housing with its bearings for the worm shaft is secured to a ledge or lip 25 projecting laterally from the apron 19.

Power for driving these mechanisms is applied by a belt to a pulley 26 fixed upon the main shaft 27, and from said shaft, by means of beveled gears 28 and 29 (Figure 10) to a shaft 30 which carries the crank pin previously mentioned. Beside the pulley 26 on the shaft 27 there is a loose pulley 31. All this is shown in Figure 10. The trains for driving the index wheels 14 and 21 are most clearly shown in the diagrammatic view Figure 15, although parts of such trains are likewise shown in Figures 5, 6, 7, 8, and 10. Referring to Figure 15, 32 is a pulley functionally integral with pulley 26, and it drives by means of a belt 33 (see Figures 6 and 9) a pulley 34 on a shaft 36 journaled in the top of the machine frame. Shaft 36 carries a pinion 37, driving a gear 38, on an intermediate shaft 39; the latter carries a gear 40 driving a gear 41 on a shaft 52; shaft 52 carries in addition two gears 53 and 54, of which the first drives gears 55 and 56 on a shaft 57, and through the gear 56 drives a gear 58 on a shaft 59, which carries the worm 15. The shaft 57 carries a bevel gear 60 meshing with a bevel gear 61 on an inclined shaft 62 (see also Figure 6), and shaft 62 drives the shaft 23 of the worm 22 through the bevel gears 63 and 64. Thus the cutter and work spindles are driven by gear trains, which are common as far as the shaft 57, and of which the values from that shaft to the spindles are so designed that the cutter and work piece are rotated with the same linear velocity at their pitch lines. In the illustrated machine these spindles are rotated in unison.

To complete the description of Figure 15 it is here stated that the gear 54 drives a gear 65 on a shaft 66 having a worm 67 which meshes with a worm wheel 68 associated with a spur gear 69 (see also Figure 8), the latter driving a cam 70 by means of a gear 71. The purpose, structure, and mode of operation of the cam 70 (which determines the position of the cutter relative to the work) will be more particularly described later in explanation of that feature of the invention which relates to positioning and controlling the cutter.

Independent adjustment of the cutter and work.

Either the cutter spindle or the work spindle independently, or both spindles in unison, may be adjusted rotatably independently of the driving mechanism and without rotation of the cam 70. This effect is made possible by connecting the gear 58 detachably to the shaft 59, and the gear pair 53 and 54 detachably to the shaft 52. This detachable connection as to gear 58 is shown in Figure 7 and it comprises a conical friction plug member 72 keyed upon the shaft and fitting a complemental recess in the gear 58, and a presser 73 arranged to bear on the gear and pressed upon by a nut or hand wheel 74 screwed upon the shaft. The plug 72 and the recess in the gear constitute a conical friction clutch which may be tightened or released by setting up or backing off the nut 74. The gear pair 53, 54 is associated with a like friction clutch of which the controlling hand nut is shown at 75 in Figures 6 and 7. The forward end of the worm shaft 59 projects beyond the machine frame at 76 (Figure 6) to receive a socket wrench or other implement by which it may be turned by hand when the clutch coupling nut 74 is released. Thus the cutter alone may be adjusted. When the clutch coupling nut 75 is released and the clutch 72 tightened the cutter spindle and work spindle may be rotated in unison for adjustment by the same hand implement. Or, if both clutches are released, the work spindle may be turned independently by a wrench applied to the protruding end of worm shaft 23.

Backing off mechanism.

I have provided in this machine a novel form of backing off mechanism which is applied to the work holding apron and is designed for rapid movement both in backing off and in returning the work. For this purpose the apron 19 carrying the work spindle is mounted on a pivot, as already stated, and it is connected by a link 77 with a lever 78, which is pivoted upon a stud 79. Said lever has a short arm 80 wherewith the link 77 is engaged, and a long arm having two branches on which are mounted respectively rolls 81 and 82 flanking a cam 83 on the main shaft 27. This cam is keyed to the shaft and has generally the form of a rib surrounding the shaft and projecting between the rolls, and formed with axial offsets in the proper locations whereby to move the lever positively in both directions at the required times. It is in effect a double cam, and is associated with two rolls in the manner shown in order that the pressure on each roll may be relieved periodically, thus permitting good lubrication of their bearings, and also permitting the rotation of each roll to take place in only one direction. The movement for backing off the work is, of course, outward from the frame. When drawn in to cutting position the quill 18 is received in a recess 84, wherein it is accurately fitted. The connections between the link 77 and both the lever arm 80 and the apron 19 are made by wrist pins 85 and 86 which are rotatably mounted in separated bearings in the arm 80 and in the apron 19, respectively, and through which the link 77 passes; the link, or at least the ends which pass through the wrist pins, being round and screw threaded and provided with adjusting nuts 87, 87 and 88, 88, whereby the backing-off mechanism may be adjusted to hold the spindle carrying quill with sufficient firmness against the seat during the cutting strokes.

The line of centers of the cutter and work spindles is at an acute angle to the line of centers of the work spindle and the pivot 20, as appears from Figure 14, whereby the work in backing off is caused to draw away from the teeth of the cutter at approximately the correct withdrawal angle. As the object of backing off is to free the cutter from contact with the work during its return stroke, it is important that the withdrawal should take place at an angle which will leave each tooth of the cutter free from both sides of the cut in which it is entered. The arrangement of the two lines of centers on the acute angle as here shown gives this result.

Figure 6:
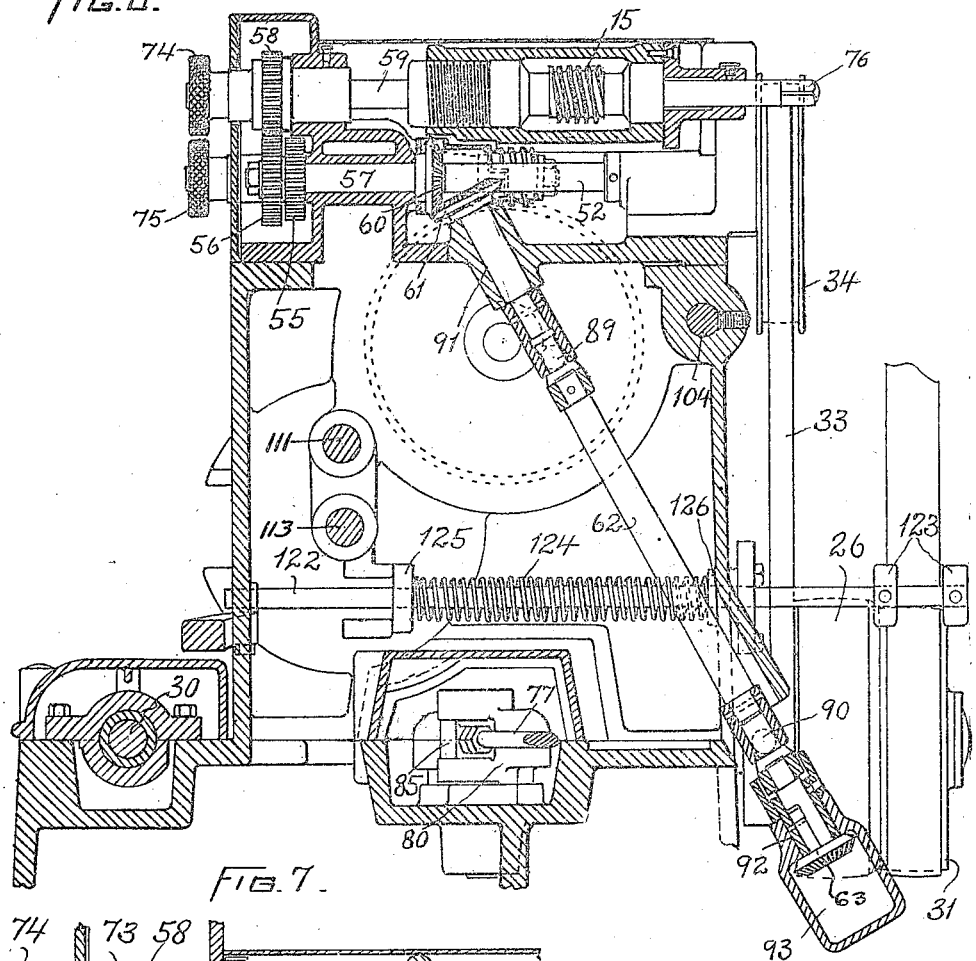
Figure 6 is a vertical section located by the line 6—6 of Figure 4.
Figure 7:
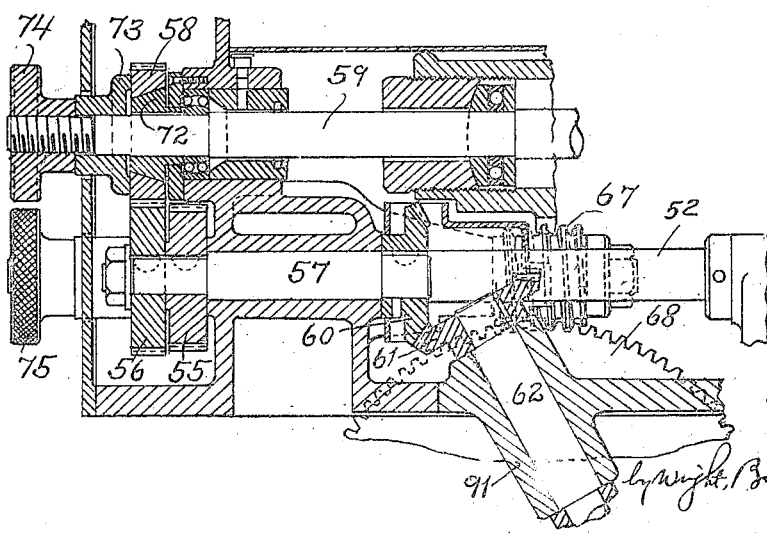
Figure 7 is a sectional view on a larger scale of part of the mechanism shown in Figure 6.

When the work is thus backed off and returned, the index worm goes with it, and in order to permit such movement, the angular transmission shaft 62 which drives the worm is provided with two universal joints at 89 and 90, respectively, as shown in Figure 6. That end of the inclined shaft which carries the bevel gear 61 is held in a fixed bearing 91 in the upper part of the frame, while the other end of the shaft is confined in a bearing 92 formed as part of a housing or cap 93, which is secured to the end of the worm housing 24, as shown in Figure 4. The universal joints here shown accommodate this shaft to the slight movement required for backing off.

*Cutter feed control.*

Figure 1:
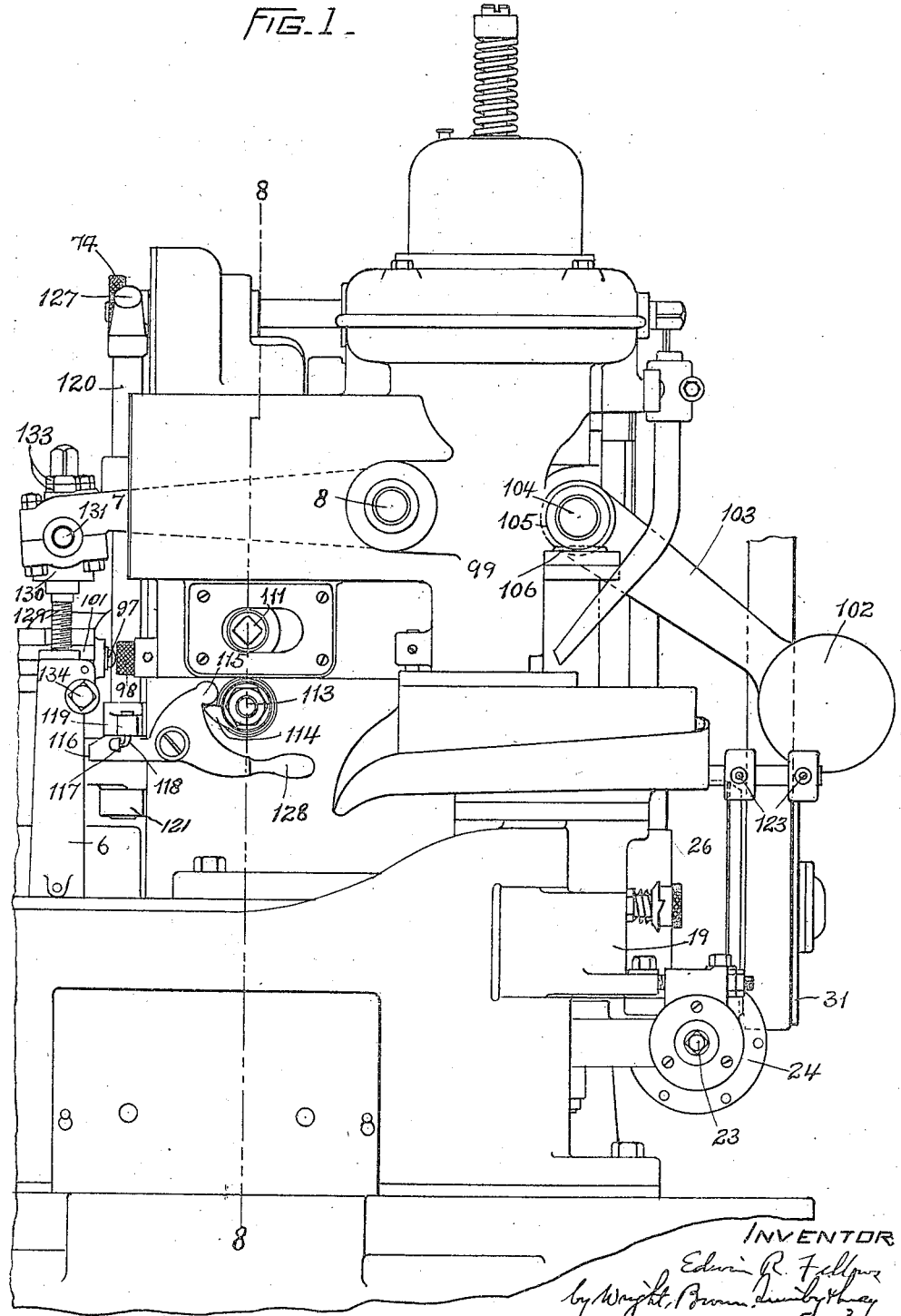

This control determines the depth to which the cutter enters the work, that is, the depth of the grooves and the height of the teeth cut and generated by the cutter in the work piece. It is effected primarily by the cam 70 previously described (see Figures 2, 3, 4, 8, 9, 13 and 15) and by the intermediate agency of a lever 94 having pivots which turn in bearings 95, 95 on the side of the machine, shown in Figure 3. One arm of this lever carries a roll 96 which bears on the edge of the cam and the other arm carries an adjustable screw stud 97 which bears against an abutment 98 (Figures 1 and 5) on the saddle 99 which carries the cutter spindle. This saddle or cutter carriage is supported by a horizontal guideway or guide rib 100 (Figure 4) whereon it is adapted to slide, and is thus enabled to carry the cutter spindle and the cutter toward and away from the axis of the work spindle. Adjustment for the position of the cutter within a limited range is made possible by the screw stud 97, which is threaded through a sleeve 101 on the end of the lever arm, and carries measuring graduations as shown in Figures 5 and 11, by which its setting may be indicated. Cam 70 is positive in one direction only and the arm of the lever which engages it is constantly pressed against the edge of the cam by the action of a weight 102 carried by arm 103, which is pivoted on a stud 104 set in the frame. This arm is secured to a pinion 105 which meshes with a short rack 106 secured to the cutter carriage. The loading by the weight tends to withdraw the cutter from the work and causes the cutter carriage to follow the recessions in the cam surfaces.

Referring now to Figures 8 and 13 it will be observed that the gear 71, which is associated with and drives the cam, is mounted rotatably on the hub part 107 of the cam and carries a pawl 108 which coacts with a gear 109 secured to the cam. This gear and pawl couple introduces an element in the drive for the cam which is positive in one direction only and allows the cam to be turned in the direction of rotation of the gear 71 independently of the latter, either by hand or by the mechanical action later described. The prime object of this feature is to permit manual adjustment of the cam without disconnection of the power mechanism, and to permit the power mechanism to pick up and drive the cam forward from any position in which it may have been left by the hand adjustment. For thus adjusting the cam one means is shown in Figure 8 comprising a pinion 110 meshing with gear 109, and a shaft 111 to which said pinion is secured and on which a crank or socket wrench 112 is applied. Other means may likewise be provided for the purpose, such as any of the well-known mechanical equivalents of a gear couple, or specifically the modification shown in Figure 16. Here the driving gear 71$^a$ is combined with the ratchet gear 109$^a$, and both are secured to a tubular shaft 111$^a$ which surrounds the shaft 113$^a$ to which the cam is secured; while the pawl 108ª is carried by the cam and coacts with ratchet 109ª with like effect to that already described. A wrench or other torque-delivering machine element applied to shaft 113ª will serve to turn the cam in making adjustments.

Turning to Figure 2, which shows the outline of cam 70, it will be seen that the cam has a deep depression at the point $a$, which depression is occupied by the roll 94 in the normal stopping position of the machine. At this time the cutter is far enough removed from the work spindle to allow work pieces to be applied or removed. From the point $a$ to the point $b$, the cam rises gradually, and the latter point brings the cutter close up to the work piece in position to begin cutting. Prior to the commencement of a cut the cam is turned manually by the means just above described to bring the point $b$ up to the lever. From $b$ to $c$ there is a further rise, which is sufficient to advance the cutter into the work to the depth required for the first or roughing cut, that is, to a depth nearly but not quite enough to make a finished gear. The greater proportion of stock necessary to be removed in cutting the gear is removed during the roughing cut, leaving a relatively small amount on all the teeth to be removed by the final or finishing cut. From $c$ to $d$ is a dwell and the cam is driven at such a rate of speed that the cutter and work make one complete rotation while this dwell is passing the lever. From $d$ to $e$ is a further slight rise, enough to feed the cutter into the work to the depth required for the finishing cut. From $e$ to $f$ is a further dwell which passes the lever while the work and cutter make another complete rotation, and from $f$ to the starting point $a$ there is a sharp drop, the inclination of which with respect to the radius of the cam is preferably so great that the back pressure applied through the carriage and lever to the cam causes the cam to be driven ahead of the ratchet gear. Therefrom results a large saving in operating time, for the free movement of the cam at that time permits withdrawal of the cutter from the work much more rapidly than would be possible if the cam were then held back to the slow speed at which it is driven by the normal driving mechanism.

Tripping mechanism.

The machine is automatically stopped at the end of each cycle and such stoppage is effected by shifting the driving belt from the fast pulley 26 to the loose pulley 31 by a tripping mechanism controlled by the cam 70. This tripping mechanism includes the following parts. The shaft 113 on which the cam is fixed (see Figure 8) is extended to the front of the machine and carries fixed upon its outer end a dog 114 which engages one arm 115 of a trip lever which has a second arm 116 carrying a latch shoulder 117. This latch shoulder obstructs a complemental latch finger 118 carried by an arm 119 (Figures 1, 3 and 5) on an upright rock shaft 120, which has also a second arm 121 pivoted to one end of a shipper rod 122. This shipper rod passes across the machine and carries belt shipper fingers 123 (Figures 6 and 9) astride the main driving belt. A spring 124 surrounding the shipper rod and confined between a fixed abutment 125 and a collar 126 secured to the rod, tends always to place the shipper in the position shown in Figures 6 and 9, that being the position wherein the driving belt is on the loose pulley 31, and hence to move it into that position when the trip lever releases the arm 119.

Thus when the dog 114 arrives at the trip lever, it displaces the lever and so releases arm 119 and allows the belt to be shifted. This effect occurs at the time when the cam incline $f$—$a$ arrives at the roll 96 on lever 94, that is, when the cutting cycle has been completed. At the same time the driving of the cam ahead by the reaction of the cutter carriage, as previously described, causes the tripping effect to take place suddenly. It may be noted that in the alternative construction shown in Figure 16, the cam shaft carries a dog 114ª, which trips the machine in the way already described.

When it is desired to start the machine the cam is first rotated by hand as previously described to bring the cutter up to the work, whereby dog 115 is carried past and clear of the trip lever arm 115; and then a hand lever 127, which is fixed to the upper end of shaft 120 and projects forward, is moved to the right. This movement shifts the belt to the fast pulley 26 and at the same time latches the trip mechanism, because the previous manual shifting of the dog 114 out of the way of trip lever arm 115 has allowed the latter lever to resume its normal position. This trip lever has a third arm 128 equipped with a handle, the weight of which and of the arm 115 overbalances the arm 116 and causes the latter to bear upwardly against the under side of arm 119. The upper side of latch abutment 117 and the lower end of latch finger 118 are complementally bevelled, so that the latter passes over the former and becomes automatically latched therewith when the belt shipper is moved as described.

The characteristics of this machine which particularly contribute to the desired end of working at high speed are the following.

(1) The cutting stroke is short and is effected by a crank and connecting rod linkage including the lever 7, which has a long arm joined to the connecting rod and a short arm for reciprocating the cutter spindle. This gives large power with smooth and even movement even though carried out at high speed.

(2) The control of the feeding in movement of the cutter by a cam solely, and the taking up of all looseness between the cam and the cutter carriage and the interposed lever by a yielding loading means, eliminates a large number of parts previously used and causes the cutter to be advanced up to and into the work quickly, and withdrawn from the work quickly at the end of the cycle; and also allows the work to be changed quickly.

(3) The means for backing off the work is quick acting, and is in addition of simple construction and of a character which holds the work rigidly while the cutting strokes take place.

Each of the three motions (that is, cutter stroke, depth feed, and backing off motion) is adjustable to the extent needed to secure accurate positioning and adjustment of the cutter and work. The adjustments for the cutter carriage and work holder apron have already been described. That for the stroke of the cutter will now be briefly described with reference particularly to Figures 5 and 12. Connection between the connecting rod 6 and lever 7 is made by a screw rod 129 contained in and projecting from a tapped socket in the connecting rod, and a sleeve 130 having trunnions 131 which fit bearings in the forked outer end of the connecting rod. The sleeve 130 is confined between a collar 132 and lock nuts 133 on the threaded rod. By loosening the lock nuts said threaded rod may be screwed in or out as may be needed to raise or lower the cutter and place the limits of its stroke to include the work piece. When the lock nuts are set up the screw rod is clamped so that it can not turn and thus the adjustments are made secure.

This rod is additionally clamped by a bolt 134 which clamps the socketed and threaded end of the connecting rod (the same being slotted at one side at such end) upon the screw rod.

It will be noted that the connecting rod 6 and lever arm 7 are approximately at right angles to one another and that the connecting rod is of relatively great length in proportion to the depth feed of the cutter. Thus the length and position of the stroke of the cutter are not appreciably changed while the cutter is fed into the work to the full extent, and the length of stroke may be made only just great enough to carry through the entire width of the work piece, and without need of allowing for any shifting in the limits of the stroke due to change of angularity between the lever and connecting rod with shifting of the position of the carriage.

The operation of the machine takes place in the following manner. Starting with the machine at rest and the cutter carriage fully withdrawn from the work spindle, the operator places on the work spindle 4 a gear blank and on the cutter spindle 2 a cutter of the proper diameter and pitch for the work to be produced. This done, he advances the cutter close to the work by turning the crank 112, and then starts the machine by moving the shipper handle 127 until the latch finger 118 is caught by the shoulder 117. Thereby the driving belt is shifted to the fast pulley 26. Shaft 27, being thereby put in rotation, reciprocates the cutter spindle by means of the crank 5, connecting rod 6 and lever 7 and causes one cutting and one return stroke with each rotation of the shaft; and, with each revolution, by means of the cam 83, lever 78 and link 77, causes the work spindle to be held firmly against the seat 84 during each cutting stroke and to be backed off far enough to clear the cutter with each return stroke. At the same time the belt drive from the shaft 27 rotates the index wheels 14 and 21 in unison through the common gear train 37, 38, 40, 41, 52 and 55 and the parallel gear trains 56, 58, 15, and 60, 61, 63, 64, 22, respectively. The feed control cam is rotated by means of the gear train 54, 65, 67, 68, 69 and 71 at such a rate that the terminal high point $f$ of the cam reaches the trundle roll on the feed lever 94 when the work piece has been rotated through a large enough angle, more than two complete revolutions, to complete the depth feed, roughing cut, depth feed for the finishing cut and the entire finishing cut. When the point $f$ has passed the center of the trundle roll the weighted arm 103 backs to the cutter carriage away from the work and applies force through the lever 94, to the cam, turning the latter quickly by means of its steep incline from $f$ to $a$, whereby the belt shipper mechanism is tripped through the tripper arms 114 and 115, whereupon the machine stops.

The principles embodied in this machine and covered by the appended claims may be applied in other ways to machines designed to accomplish similar results. Thus, for instance, either of the movements of reciprocation, depth feed, or backing off may be given to either of the spindles, and are not necessarily restricted to the particular spindles to which they are applied in the machine here illustrated.

The speeds at which this machine can run are from 560 to 1000 strokes per minute, and speeds within this range are what I mean by the term "high speed" as used in this specification. Prior to the development of this invention the highest speed attained in gear shaping machines has been from 100 to 250 strokes per minute. This great increase in speed has been made possible by the means and principles claimed as the present invention.

What I claim and desire to secure by Letters Patent is:—

1. A high-speed gear shaping machine comprising a planing cutter with cutting projections in the shape and arrangement of a complete spur gear, a completely rotatable cutter spindle carrying said cutter, a work spindle, means constructed, arranged, and operating to effect reciprocating cutting and return strokes of one of said spindles relative to the other and simultaneous generating rotary movements of both spindles, one of said spindles being mounted with capability of movement bodily toward and away from the other in directions approximately perpendicular to the cutter spindle for determing the depth of cut, and a cam arranged and operable for so moving said spindle for said purpose.

2. A gear shaping machine including rotatable cutter and work spindles, one of which is also reciprocatable, a carriage holding one of said spindles and movable toward and away from the axis of the other, a cam arranged to apply force to said carriage for moving it in one direction, and a yielding loading means arranged to apply force to said carriage in the opposite direction and maintaining pressure between it and the cam.

3. A gear shaping machine comprising rotatable cutter and work spindles adapted to carry a generating planing cutter and a work piece respectively, one of said spindles being reciprocatable as well, a carriage holding one of said spindles and movable therewith toward and away from the axis of the other to cause penetration of the cutter into the work, a cam acting upon said carriage, and a combination of manual and automatic means for rotating said cam.

4. A gear shaping machine comprising rotatable cutter and work spindles adapted to carry a generating planing cutter and a work piece respectively, one of said spindles being reciprocatable as well, a carriage holding one of said spindles and movable therewith toward and away from the axis of the other to cause penetration of the cutter into the work, a cam acting upon said carriage, said cam having successive steps and dwells in its surface, and means for rotating the cam at such a rate that the dwells respectively preceding and following the last step each act upon the carriage through a complete rotation of the work spindle.

5. A gear shaping machine comprising rotatable cutter and work spindles adapted to carry a generating planing cutter and a work piece respectively, one of said spindles being reciprocatable as well, a carriage holding one of said spindles and movable therewith toward and away from the axis of the other to cause penetration of the cutter into the work, a cam acting upon said carriage, and means for rotating said cam at a speed so much slower than the work spindle that the latter makes two rotations within the course of one rotation of the former, the cam having a rise arranged to feed the cutter into the work, a dwell for holding the cutter in position for making a preliminary cut, a further rise for advancing the cutter into the position for making a finishing cut, a dwell for holding it in the latter position, and a descent to permit recession of the cutter at the end of the cut.

6. In a gear cutting machine the combination with a cutter carriage and a work holder of a cam for controlling the feed of the cutter up to, and in recession from the work, a yielding force-applying means, acting upon said carriage tending to move it away from the work and applying pressure through the carriage upon the cam, and means for rotating said cam including a pawl and ratchet mechanism positive in one direction only and adapted and constructed to permit independent movement of the cam ahead of it, said cam having an inclined surface arranged to cause the pressure so applied by the carriage to drive it ahead of the pawl and ratchet mechanism.

7. In a gear cutting machine the combination with a cutter spindle, a work spindle, and a carriage holding one of said spindles and being movable to carry the same toward and away from the axis of the other spindle, of a cam controlling said movements of the carriage and having a recessed part to permit relatively wide recession of the carriage supported spindle from the other spindle, automatic means for driving said cam comprising a pawl and ratchet couple, one member of which is attached to the cam, a power drive for the other element of the couple, and manual means for independently advancing the cam in the direction of drive of said couple.

8. In a gear shaping machine, a cutter spindle, a gear-shaped planing cutter carried by said spindle, a work spindle adapted to hold a work piece, means for reciprocating one of said spindles lengthwise, means for imparting simultaneous generating rotation to both spindles, a carriage holding one of said spindles and movable in directions transverse to the axis of the cutter to place the cutter and work relatively in cutting position and apart, a cam for so moving said carriage, and a lever interposed between the cam and carriage and bearing on each for transmitting motion from the former to the latter, said lever having an adjustable bearing member adapted to be shifted to place the carriage in a given position.

9. In a gear shaping machine the combination with rotatable spindles for the cutter and work, one of which is reciprocatable to effect relative planing movements between the cutter and work, and means for moving one of said spindles to clear the work and cutter during the non-cutting strokes, said means comprising a pivoted apron carrying said spindle, a lever having a short arm, a link connecting said short lever arm with the apron, arranged to swing the apron about its pivot when the lever is oscillated, and a cam for oscillating said lever.

10. In a gear shaping machine the combination with rotatable spindles for the cutter and work, one of which is reciprocatable to effect relative planing movements between the cutter and work, means for moving one of said spindles to clear the work and cutter during the non-cutting strokes, said means comprising a pivoted apron carrying said spindle, a lever having a short arm, a link connecting said short lever arm with the apron, arranged to swing the apron about its pivot when the lever is oscillated, and a cam for oscillating said lever, said cam being rotatably mounted and comprising a rib surrounding its axis of rotation and being in part offset axially.

11. In a gear shaping machine the combination with rotatable spindles for the cutter and work, one of which is reciprocatable to effect relative planing movements between the cutter and work, and means for moving one of said spindles to clear the work and cutter during the non-cutting strokes, said means comprising a pivoted apron carrying said spindle, a lever having a short arm, a link connecting said short lever arm with the apron, arranged to swing the apron about its pivot when the lever is oscillated, and a cam for oscillating said lever, said lever having a long arm with projections which embrace and engage alternately with the opposite sides of said cam.

12. In a gear shaping machine having cutter and work spindles adapted to effect cutting of the work with a planing action, a means for causing the work and cutter to be separated during the non-cutting strokes and to be firmly supported during the cutting strokes, consisting of a pivoted apron on which one of said spindles is mounted, a rigid abutment against which a part of the apron is held during the cutting strokes, and positive rigid mechanism comprising a lever and a link connecting said lever with said apron and operated to hold the latter against said abutment and to move it away therefrom respectively by a swinging movement about its pivot.

13. In a gear shaping machine a spindle carrying apron, a rigid abutment against which said apron is adapted to bear and from which it is removable, an operating lever for said apron, means for oscillating said lever, and a link between said lever and apron, said link at its ends passing through anchorages on the lever and apron respectively and having adjusting nuts flanking both said anchorages and being adjustable whereby to effect accurate positioning of the apron with respect to the abutment.

14. A backing off mechanism for a gear shaping machine comprising an apron carrying one of the spindles of said machine and being movably mounted, a positioning abutment against which a part of said apron is adapted to be held during the cutting strokes, a lever having a short arm and two separated projections, a link connected with said short lever arm and with the apron, said arm and the link being arranged to effect movement of the apron away from and against the said abutment with oscillation of the lever, and a driving cam arranged between and embraced by said lever projections.

15. In a gear shaping machine a spindle carriage mounted to move in substantially horizontal directions, and a means for moving said carriage back and forth to effect relative approach and separation between the cutter and the work, comprising a cam arranged to apply pressure against the carriage, and a weight acting upon the carriage to apply pressure against the cam.

16. In a gear shaping machine a spindle carriage, a means for moving said carriage back and forth to effect relative approach and separation between the cutter and the work, comprising a cam arranged to apply pressure against the carriage, and a weight acting upon the carriage to apply pressure against the cam, said weight comprising a pivoted arm, a pivot on which said arm is mounted to swing, a pinion secured to the arm, and a rack mounted on the carriage and meshed with said pinion.

17. In a high speed gear shaper, spindles carrying the cutter and work pieces, one of said spindles being movable lengthwise for cutting, and mechanism for so moving the same rapidly and at the same time forcibly and smoothly consisting of a lever having a toothed arm meshing with a series of teeth connected with the spindle, a connecting rod engaged with the long arm of said lever, and a crank for driving said connecting rod, the long arm of said lever being a multiple of the length of its short arm.

18. In a gear shaping machine rotatable spindles for the cutter and work, one of said spindles being movable lengthwise to effect the cutting and reverse strokes, and operating means for so moving said spindle comprising a crank, a connecting rod, and a lever having two arms, one of said arms being engaged with the spindle in a manner to reciprocate the latter when oscillated and the other arm being connected to said connecting rod at substantially right angles thereto.

19. In a gear shaping machine having rotating spindles for the cutter and work, and one of said spindles being movable lengthwise to effect the cutting and reverse strokes, operating means for so moving said spindle comprising a crank, a connecting rod and a lever having one arm engaged with the spindle in a manner to reciprocate the latter when oscillated, and a second arm connected to said connecting rod, and a carriage holding said spindle and being movable in a manner to cause relative approach and recession between the cutter and work piece carried by said spindles, the second arm of said lever extending in substantially the direction of movement of the carriage and the connecting rod being substantially at right angles to said second arm and being itself of such length as to permit such movement of the carriage without sensibly altering the limits of said endwise movements.

20. In a gear shaping machine, a carriage movable back and forth, a rotatable cam having a surface adapted to apply force for moving the carriage in one direction, mechanism including a pawl for driving the said cam positively in one direction only, yielding means applying force to said carriage and tending constantly to move it oppositely to the direction in which it is moved by the cam, and tripping mechanism for stopping the machine operable by the cam at the end of the cycle.

21. In a gear shaping machine, the combination with a work holder, a cutter holder, one of which holders is movable toward and away from the other, and means for effecting relative cutting and return movements between the cutters and work-piece mounted, respectively, on said holders, of a shipper mechanism for starting and stopping the machine, means tending to move said mechanism from the starting to the stopping position, a latch arranged to hold said mechanism in the starting position, a dog operable to trip said latch, a machine element carrying and moving said dog, mechanism for normally driving said machine element, and separate independently acting means for additionally driving said element at the conclusion of a cycle of operations of the machine, the dog being then in the position where the movement imparted by said additional means causes it to trip said latch and release the shipper mechanisms.

22. In a gear shaping machine, a carriage movable back and forth, a rotatable cam having a surface adapted to apply force for moving the carriage in one direction, mechanism including a pawl for driving the said cam positively in one direction only, yielding means applying force to said carriage and tending constantly to move it oppositely to the direction in which it is moved by the cam, said cam having that part of its surface which becomes effective at the end of the cutting cycle inclined at such a pitch that the pressure applied by the carriage under the pressure of said yielding means is effective to drive the cam ahead of its driving mechanism, whereby a rapid withdrawal of the carriage is permitted.

23. In a gear shaping machine, the combination with a work holder, a cutter holder, one of which holders is movable toward and away from the other, and means for effecting relative cutting and return movements between the cutters and work-pieces mounted, respectively, on said holders, of a shipper mechanism for starting and stopping the machine, means tending to move said mechanism from the starting to the stopping position, a latch arranged to hold said mechanism in the starting position, a dog operable to trip said latch, a feed cam connected to the dog and moving it when rotated, a carriage arranged to be moved in one direction by pressure applied by the feed cam, yielding means applying force to the carriage in the opposite direction, and driving means for the cam including an element which applies force in one direction of rotation only to the cam, the cam having a part of its bearing surface shaped to give it additional rotation in the said direction under the force applied to it through the carriage by said yielding means, said part being arranged to receive the application of such force when the dog is in position to trip said latch.

24. In a gear shaping machine the combination with a rotatable work spindle and a cutter carrying spindle, of gear trains leading from said spindles to a common source of power and including a shaft, a gear loose on said shaft and a friction clutch for releasably securing the gear to the shaft, release of said gear permitting one of the spindles to be independently manually rotated.

25. In a gear shaping machine, cutter and work spindles adapted to be simultaneously rotated, a source of power, gear trains from said source of power to both spindles, a part of the gearing being common to both trains, and means for disconnecting one of the gears in said common part, whereby to permit a manual adjustment of both spindles together.

26. In a gear shaping machine the combination of cutter and work spindles, both rotatably mounted, a source of power, a gear train including a shaft and a gear loosely mounted upon it, friction means for releasably securing said gear to said shaft, and separate trains driven by said gear transmitting motion to the several spindles, the release of said gear permitting said spindles to be manually adjusted in unison.

27. In a gear shaping machine the combination of cutter and work spindles, both rotatably mounted, a source of power, a gear train including a shaft and a gear loosely mounted upon it, friction means for releasably securing said gear to said shaft, and separate trains driven by said gear transmitting motion to the several spindles, the release of said gear permitting said spindles to be manually adjusted in unison, and the separate train to one of the spindles including a releasable gear to permit independent adjustment of the last named spindle.

28. In a gear shaping machine the combination of cutter and work spindles, both rotatably mounted, a source of power, driving trains from said source of power to both spindles for giving them unisonal generating rotation, and a clutch in the train to the cutter spindle disconnectible to permit independent rotational adjustment of that spindle.

29. In a gear shaping machine the combination of cutter and work spindles, both rotatably mounted, a source of power, driving trains from said source of power to both spindles for giving them unisonal generating rotation, a disconnectible clutch between said source of power and both trains and a second disconnectible clutch in the separate train to the cutter spindle; whereby, upon disconnection of both clutches, either spindle may be independently adjusted rotatably.

30. In a gear shaping machine the combination of cutter and work spindles, both rotatably mounted, a source of power, driving trains from said source of power to both spindles for giving them unisonal generating rotation, and clutch means in said trains adapted to be disconnected, whereby to permit independent rotational adjustment of the work spindle.

In testimony whereof I have affixed my signature.

EDWIN R. FELLOWS.